United States Patent
Xue et al.

(10) Patent No.: US 10,766,115 B2
(45) Date of Patent: Sep. 8, 2020

(54) MULTIFUNCTIONAL WHEEL BURR REMOVING DEVICE

(71) Applicant: CITIC Dicastal CO., LTD, Qinhuangdao (CN)

(72) Inventors: Bowen Xue, Qinhuangdao (CN); Xuesong Wang, Qinhuangdao (CN); Jiandong Guo, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 288 days.

(21) Appl. No.: 15/938,641

(22) Filed: Mar. 28, 2018

(65) Prior Publication Data

US 2019/0193231 A1    Jun. 27, 2019

(30) Foreign Application Priority Data

Dec. 21, 2017   (CN) .......................... 2017 1 13943483

(51) Int. Cl.
| | |
|---|---|
| B24B 9/00 | (2006.01) |
| B24B 41/00 | (2006.01) |
| B24B 41/02 | (2006.01) |
| B24B 41/06 | (2012.01) |
| B24B 47/12 | (2006.01) |
| B24B 27/00 | (2006.01) |
| B24B 29/00 | (2006.01) |
| B24B 9/04 | (2006.01) |

(52) U.S. Cl.
CPC ................. *B24B 9/00* (2013.01); *B24B 9/04* (2013.01); *B24B 27/0069* (2013.01); *B24B 27/0076* (2013.01); *B24B 29/005* (2013.01); *B24B 41/005* (2013.01); *B24B 41/02* (2013.01); *B24B 41/06* (2013.01); *B24B 41/067* (2013.01); *B24B 47/12* (2013.01)

(58) Field of Classification Search
CPC ......... B24B 9/00; B24B 9/04; B24B 27/0069; B24B 27/0076; B24B 29/05; B24B 41/005; B24B 41/02; B24B 41/06; B24B 41/067; B24B 47/12

See application file for complete search history.

(56) References Cited

U.S. PATENT DOCUMENTS

| | | | | |
|---|---|---|---|---|
| 9,833,873 B2* | 12/2017 | Xue | ...................... | B24B 29/005 |
| 10,010,992 B2* | 7/2018 | Xue | ...................... | B24B 47/12 |
| 10,022,834 B2* | 7/2018 | Xue | ...................... | B24B 29/005 |

\* cited by examiner

*Primary Examiner* — Dung Van Nguyen
(74) *Attorney, Agent, or Firm* — Calfee, Halter & Griswold LLP

(57) ABSTRACT

Disclosed in the application are a multifunctional wheel burr removing device, which includes a lower brush system, a turnover system, a synchronous clamping and rotating system, an upper brush system and the like. The multifunctional wheel burr removing device may be used for removing burrs from a riser, a cap seam allowance, a valve hole, bolt holes and bolt counter bores of a wheel, and has the characteristics of high automation degree, high removal efficiency, advanced process, strong universality, and safe and stable performance at the same time.

1 Claim, 4 Drawing Sheets

MULTIFUNCTIONAL WHEEL BURR REMOVING DEVICE

CROSS-REFERENCE TO RELATED APPLICATIONS

This application claims priority to Chinese Patent Application No. 201711394348.3 filed on Dec. 21, 2017, which is hereby incorporated by reference in its entirety.

TECHNICAL FIELD

The present application relates to burr removing device, and specifically, to multifunctional wheel burr removing device.

BACKGROUND ART

In the machining process of an aluminum alloy wheel, burrs will definitely be produced at the machined positions of a riser, a cap seam allowance, a valve hole, bolt holes, bolt hole counter bores and the like. If the produced burrs are not removed in time, the subsequent coating effect will be seriously affected, and even the wheel is corroded in advance during use.

SUMMARY OF THE INVENTION

The aim of the present application is to provide multifunctional wheel burr removing device, which may be used for removing burrs from a riser, a cap seam allowance, a valve hole, bolt holes and bolt counter bores of a wheel.

In order to fulfill the above aim, the technical solution of the present application is: multifunctional wheel burr removing device, includes a frame, first cylinders, a lower fixed plate, first belt pulleys, first shafts, first bearing seats, a first synchronous belt, a lower lifting plate, first gears, first racks, first guide rails, sliding supports, first servo motors, second shafts, second bearing seats, springs, third shafts, brush heads, a second servo motor, a first turnover support, a second belt pulley, a second cylinder, a second synchronous belt, a third bearing seat, a third belt pulley, a fourth shaft, second guide rails, a left sliding plate, second racks, left shafts, fourth bearing seats, V-shaped rollers, a second gear, a brush disc, a fourth belt pulley, a fifth shaft, a third synchronous belt, a rotating support, fifth belt pulley, a third servo motor, a sixth shaft, a fifth bearing seat, a fourth servo motor, a second turnover support, a fifth servo motor, a servo electric cylinder, an upper sliding plate, an upper lifting plate, a third guide rail, upper guide posts, upper guide sleeves, third cylinders, a brush shaft, right shafts, sixth bearing seats, a right sliding plate, a sixth servo motor, a seventh bearing seat, a seventh shaft, a seventh servo motor, lower guide posts, lower guide sleeves and the like.

A lower lifting system includes: the two first cylinders and the four lower guide sleeves are all fixed on the lower fixed plate, and the four lower guide posts matched with the lower guide sleeves are fixed below the lower lifting plate; and the output ends of the first cylinders are articulated with the lower part of the lower lifting plate.

A burr brushing unit includes: the bearing seat I is fixed below the lower lifting plate, and the first shaft is mounted inside the bearing seat I via bearings; the first gear is fixed at the upper end of the first shaft, and the first belt pulley is fixed at the lower end of the first shaft; the bottom of the sliding support is mounted above the lower lifting plate via the first guide rail; the first rack is fixed below the sliding support, and engaged with the first gear; the second bearing seat is fixed above a top plate of the sliding support; the second shaft is mounted inside the second bearing seat via bearings; the shaft third shaft is in sliding fit with the upper end of the second shaft; the spring is mounted inside the second shaft, and arranged below the third shaft; the brush head is fixed at the top of the third shaft; the first servo motor is fixed below the top of the sliding support, and the output end of the first servo motor is connected with the lower part of the second shaft.

A lower brush system includes five burr brushing units, which are uniformly distributed in the circumferential direction; the first synchronous belt is connected with the first belt pulleys in the five burr brushing units; the seventh servo motor is fixed below the lower lifting plate, and the output end of the seventh servo motor is connected with the lower part of the first shaft in one burr-brushing unit.

A turnover system includes: the second servo motor is fixed at the lower part of the left side of the frame, and the second belt pulley is fixed at the output end of the second servo motor; the third bearing seat is fixed on the left side of the frame, and arranged above the second servo motor; the fourth shaft is mounted inside the third bearing seat via bearings; the third belt pulley is fixed on the right side of the fourth shaft; the right end of the fourth shaft is fixed at the left end of the first turnover support; the second belt pulley is connected with the third belt pulley via the second synchronous belt; the seventh bearing seat is fixed on the right side of the frame; the seventh shaft is mounted inside the seventh bearing seat via bearings, and the left end of the seventh shaft is fixed at the right end of the first turnover support.

A synchronous clamping and rotating system includes: the second gear is fixed above a bottom plate of the first turnover support; the left sliding plate is mounted above the bottom plate of the first turnover support via a second guide rail; the second cylinder is also fixed above the bottom plate of the first turnover support, and the output end of the second cylinder is connected with the lower part of the left sliding plate; a second rack is fixed below the left sliding plate, and the two fourth bearing seats are fixed above the left sliding plate; the two left shafts are mounted inside the fourth bearing seats via bearings; two V-shaped rollers are respectively mounted above the two left shafts; the right sliding plate is mounted above the bottom plate of the first turnover support via a second guide rail; a second rack is fixed below the right sliding plate, and the two sixth bearing seats are fixed above the right sliding plate; the second rack below the left sliding plate and the second rack below the right sliding plate are simultaneously engaged with the second gear; the two right shafts are mounted inside the sixth bearing seats via bearings; two V-shaped rollers are respectively mounted above the two right shafts; sixth servo motor is fixed below the right sliding plate, and the output end of sixth servo motor is connected with the lower end of one right shaft.

An upper brush system includes: the fifth shaft is mounted below the rotating support via bearings; the brush disc is fixed at the leftmost end of the fifth shaft; the fourth belt pulley is fixed at the left end of the fifth shaft, and arranged between the brush disc and the rotating support; the brush shaft is mounted at the right end of the fifth shaft; the third servo motor is fixed on the left side of the rotating support, and the fifth belt pulley is fixed at the output end of the third servo motor; the fourth belt pulley is connected with the fifth bearing pulley via the third synchronous belt; the fifth bearing seat is fixed below a bottom plate of the second turnover support; the sixth shaft is mounted inside the fifth bearing seat via bearings; the fourth servo motor is fixed above the bottom plate of the second turnover support, and the output end of the fourth servo motor is connected with the top of the sixth shaft; the top of the rotating support is fixed below the sixth shaft; the second turnover support is mounted below the upper sliding plate via a pin roll; the fifth servo motor is fixed on a side plate below the upper sliding plate, and the output end of the fifth servo motor is connected with the pin roll for connecting the second turnover support; the upper sliding plate is mounted below the upper lifting plate via the third guide rail; the servo electric cylinder is fixed below the upper lifting plate, and the output end of the servo electric cylinder is connected with the upper sliding plate.

An upper lifting system includes: the two third cylinders and the four upper guide sleeves are fixed at the top of the frame; the four upper guide posts matched with the four upper guide sleeves are fixed at the top of the upper lifting plate; and the output ends of the two third cylinders are articulated with the upper part of the upper lifting plate.

In the working process, the second cylinder drives the four V-shaped rollers via the second gear and the second racks to synchronously clamp a wheel, and sixth servo motor drives the clamped wheel to rotate; the third servo motor drives the brush disc via the third synchronous belt to rotate; the third cylinders drive the brush disc via the upper guide posts to descend, and when the brush disc contacts a riser of the wheel, burrs thereon may be removed; the angle of the brush shaft in the horizontal direction may be adjusted under the drive of the fourth servo motor via the sixth shaft, the included angle between the brush shaft and the vertical direction may be adjusted under the drive of the fifth servo motor via the second turnover support, and the position of the brush shaft in the horizontal direction may be adjusted under the drive of the servo electric cylinder via the third guide rail; after the angle and position of the brush shaft are adjusted to be proper, burrs may be removed from a cap seam allowance and a valve hole of the wheel with the use of the brush shaft; the five brush heads are adjusted to pitch circles of bolt holes of the wheel under the drive of the seventh servo motor via the first synchronous belt, the first gears, the first racks and the like; sixth servo motor drives the wheel to rotate till the center of each bolt hole is just concentric with the axis of each brush head; the first cylinders drive the brush heads via the lower guide posts to ascend, and when the brush heads contact the bolt holes of the wheel, burrs may be simultaneously removed from the bolt holes; the second servo motor drives the first turnover support and the wheel via the second synchronous belt to turn over 180 degrees, and burrs may also be removed from bolt hole counter bores by the same method.

The present application may be used for removing burrs from a riser, a cap seam allowance, a valve hole, bolt holes and bolt counter bores of a wheel, and has the characteristics of high automation degree, high removal efficiency, advanced process, strong universality, and safe and stable performance at the same time.

Figure 1:
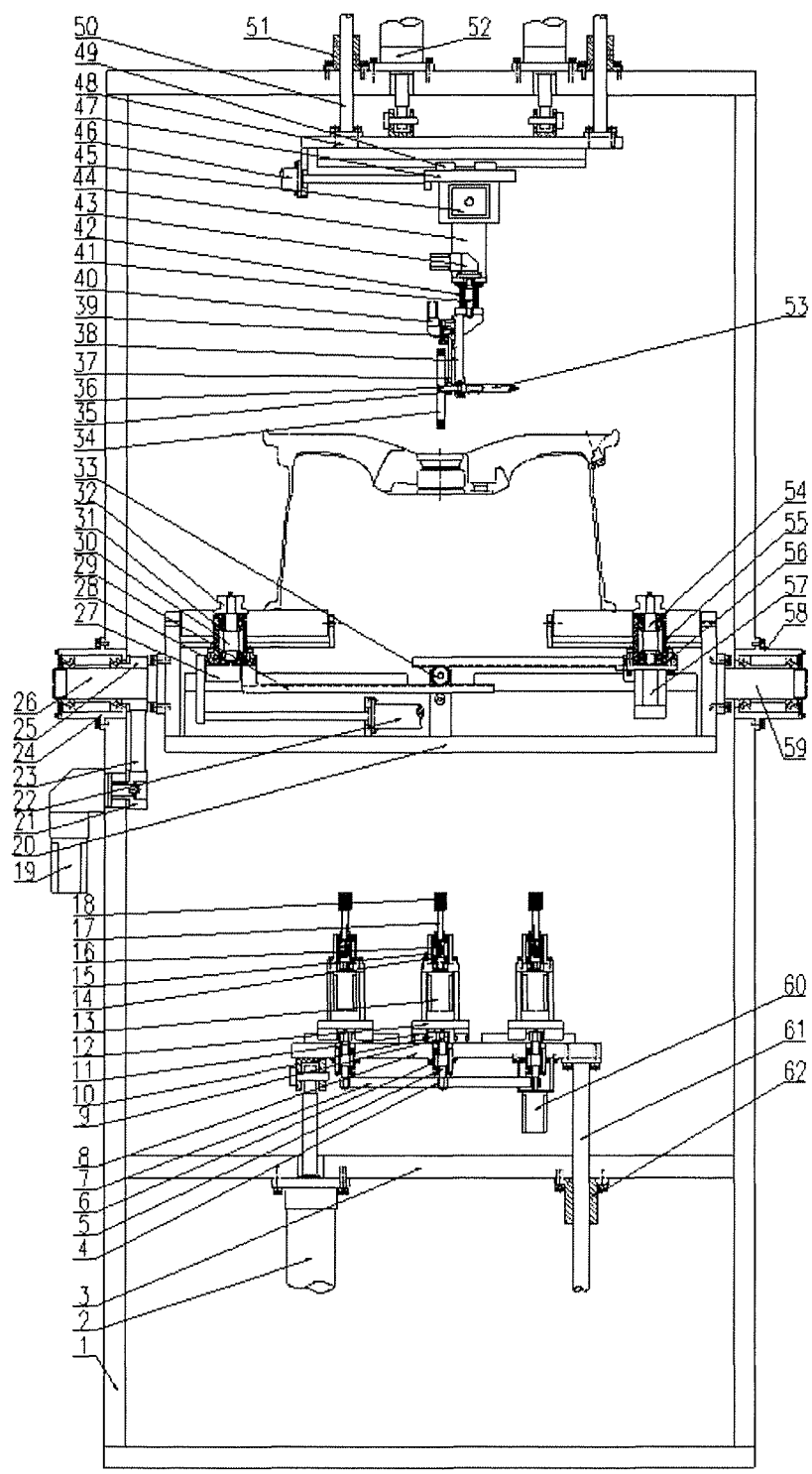
FIG. 1 is a front view of multifunctional wheel burr removing device of the present application.
Figure 2:
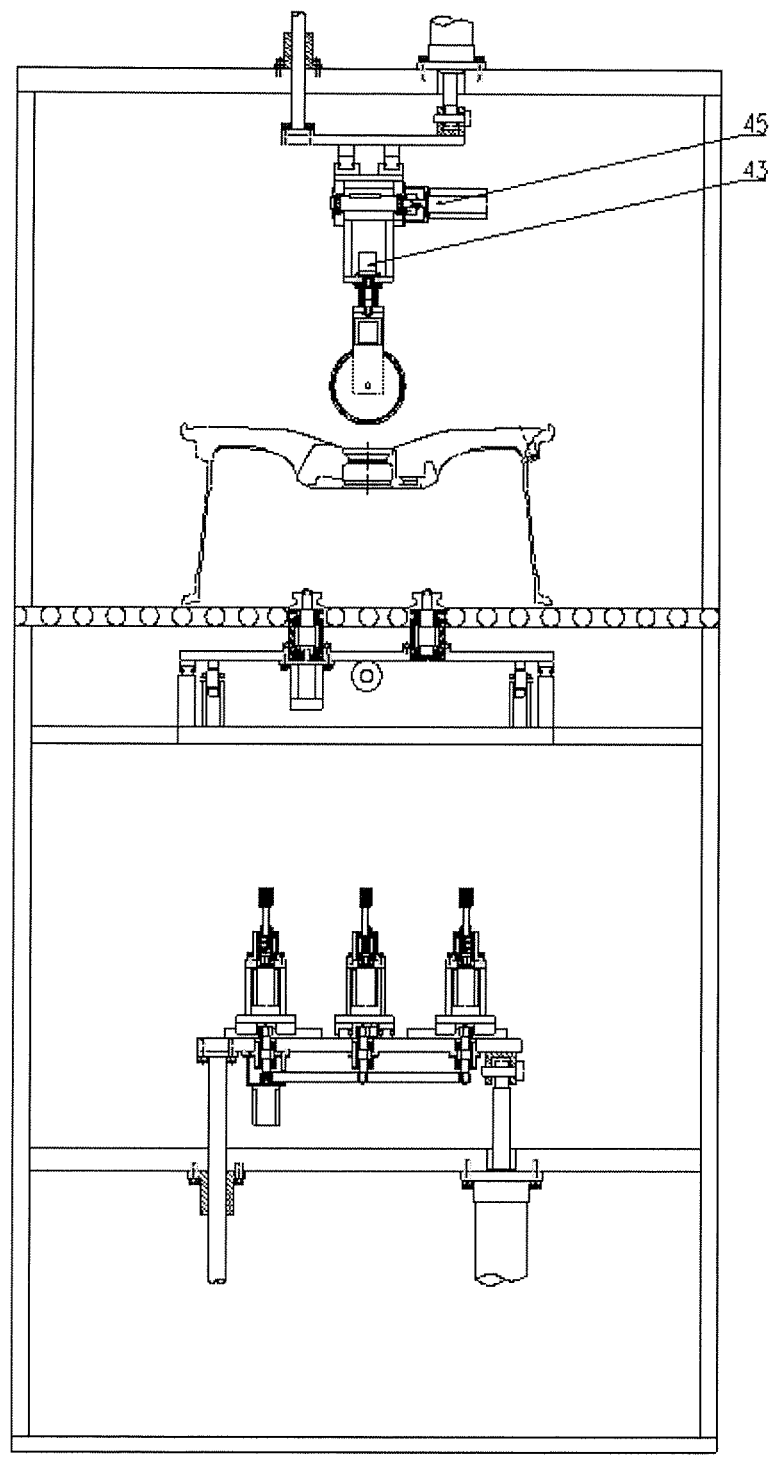
FIG. 2 is a left view of the multifunctional wheel burr removing device of the present application.
Figure 3:
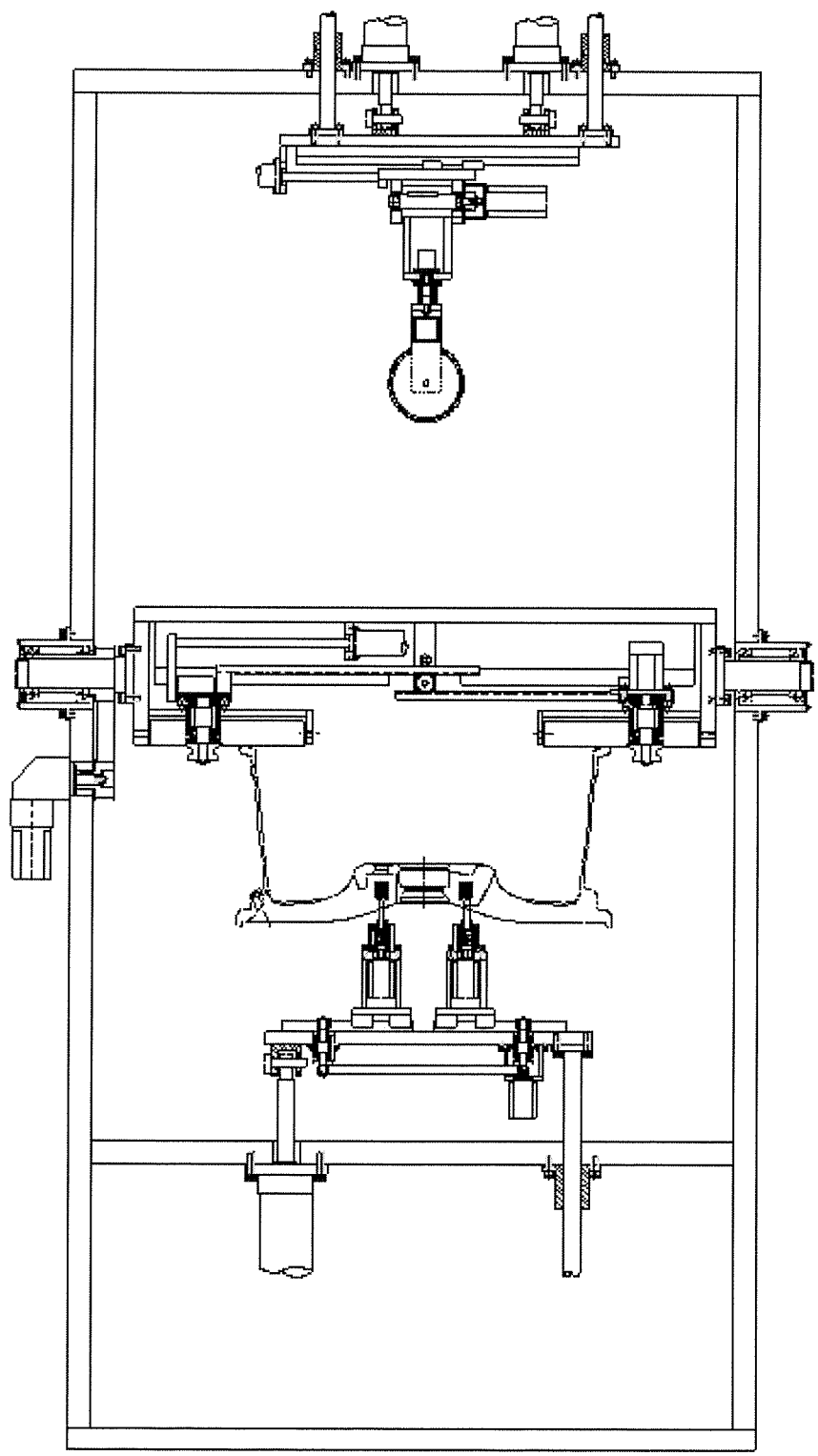
FIG. 3 is a front view of the multifunctional wheel burr removing device of the present application after a wheel is turned over.
Figure 4:
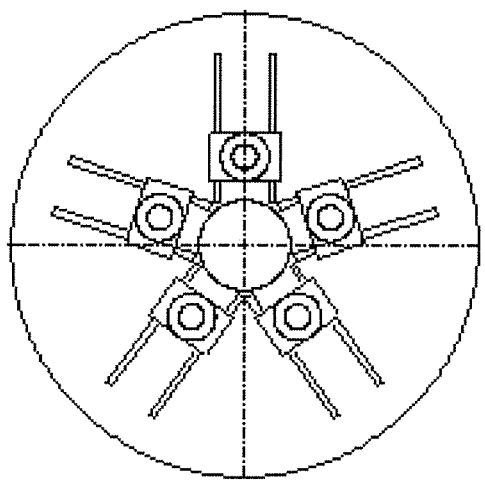
FIG. 4 is a partial top view of the multifunctional wheel burr removing device of the present application.

In which, 1—frame, 2—first cylinder, 3—lower fixed plate, 4—first belt pulley, 5—first shaft, 6—first bearing seat, 7—first synchronous belt, 8—lower lifting plate, 9—first gear, 10—first rack, 11—first guide rail, 12—sliding support, 13—first servo motor, 14—second shaft, 15—second bearing seat, 16—spring, 17—third shaft, 18—brush head, 19—second servo motor, 20—first turnover support, 21—second belt pulley, 22—second cylinder, 23—second synchronous belt, 24—third bearing seat, 25—third belt pulley, 26—fourth shaft, 27—second guide rail, 28—left sliding plate, 29—second rack, 30—left shaft, 31—fourth bearing seat, 32—V-shaped roller, 33—second gear, 34—brush disc, 35—fourth belt pulley, 36—fifth shaft, 37—third synchronous belt, 38—rotating support, 39—fifth belt pulley, 40—third servo motor, 41—sixth shaft, 42—fifth bearing seat, 43—fourth servo motor, 44—second turnover support, 45—fifth servo motor, 46—servo electric cylinder, 47—upper sliding plate, 48—upper lifting plate, 49—third guide rail, 50—upper guide post, 51—upper guide sleeve, 52—third cylinder, 53—brush shaft, 54—right shaft, 55—sixth bearing seat, 56—right sliding plate, 57—sixth servo motor, 58—seventh bearing seat, 59—seventh shaft, 60—seventh servo motor, 61—lower guide post, 62—lower guide sleeve.

DETAILED DESCRIPTION OF THE INVENTION

Specific details and working conditions of equipment provided by the present application will be described below in combination with the accompanying drawings.

The device includes a frame 1, first cylinders 2, a lower fixed plate 3, first belt pulleys, 4, first shafts 5, first bearing seats 6, a first synchronous belt 7, a lower lifting plate 8, first gears 9, first racks 10, first guide rails 11, sliding supports 12, first servo motors 13, second shafts 14, second bearing seats 15, springs 16, third shafts 17, brush heads 18, a second servo motor 19, a first turnover support 20, a second belt pulley 21, a second cylinder 22, a second synchronous belt 23, a third bearing seat 24, a third belt pulley 25, a fourth shaft 26, second guide rails 27, a left sliding plate 28, second racks 29, left shafts 30, fourth bearing seats 31, V-shaped rollers 32, a second gear 33, a brush disc 34, a fourth belt pulley 35, a fifth shaft 36, a third synchronous belt 37, a rotating support 38, a fifth belt pulley 39, a third servo motor 40, a sixth shaft 41, a fifth bearing seat 42, a fourth servo motor 43, a second turnover support 44, a fifth servo motor 45, a servo electric cylinder 46, an upper sliding plate 47, an upper lifting plate 48, a third guide rail 49, upper guide posts 50, upper guide sleeves 51, third cylinders 52, a brush shaft 53, right shafts 54, sixth bearing seats 55, a right sliding plate 56, a sixth servo motor 57, a seventh bearing seat 58, a seventh shaft 59, a seventh servo motor 60, lower guide posts 61, lower guide sleeves 62 and the like.

A lower lifting system includes: the two first cylinders 2 and the four lower guide sleeves 62 are all fixed on the lower fixed plate 3, and the four lower guide posts 61 matched with the lower guide sleeves 62 are fixed below the lower lifting plate 8; and the output ends of the first cylinders 2 are articulated with the lower part of the lower lifting plate 8.

A burr brushing unit includes: the first bearing seat 6 is fixed below the lower lifting plate 8, and the first shaft 5 is mounted inside the first bearing seat 6 via bearings; the first gear 9 is fixed at the upper end of the first shaft 5, and the first belt pulley 4 is fixed at the lower end of the first shaft 5; the bottom of the sliding support 12 is mounted above the lower lifting plate 8 via the guide rail 11; the first rack 10 is fixed below the sliding support 12, and engaged with the first gear 9; the first bearing seat 15 is fixed above a top plate of the sliding support 12; the second shaft 14 is mounted inside the second bearing seat 15 via bearings; the third shaft 17 is in sliding fit with the upper end of the second shaft 14; the spring 16 is mounted inside the second shaft 14, and arranged below the third shaft 17; the brush head 18 is fixed at the top of the third shaft 17; the first servo motor 13 is fixed below the top of the sliding support 12, and the output end of the first servo motor 13 is connected with the lower part of the second shaft 14.

A lower brush system includes five burr brushing units, which are uniformly distributed in the circumferential direction; the first synchronous belt 7 is connected with the first belt pulleys 4 in the five burr brushing units; the seventh servo motor 60 is fixed below the lower lifting plate 8, and the output end of the seventh servo motor 60 is connected with the lower part of the first shaft 5 in one burr brushing unit.

A turnover system includes: the second servo motor 19 is fixed at the lower part of the left side of the frame 1, and the second belt pulley 21 is fixed at the output end of the second servo motor 19; the third bearing seat 24 is fixed on the left side of the frame 1, and arranged above the second servo motor 19; the fourth shaft 26 is mounted inside the third bearing seat 24 via a bearings; the third belt pulley 25 is fixed on the right side of the fourth shaft 26; the right end of the fourth shaft 26 is fixed at the left end of the first turnover support 20; the second belt pulley 21 is connected with the third belt pulley 25 via the second synchronous belt 23; the seventh bearing seat 58 is fixed on the right side of the frame 1; the seventh shaft 59 is mounted inside the seventh bearing seat 58 via bearings, and the left end of the seventh shaft 59 is fixed at the right end of the first turnover support 20.

A synchronous clamping and rotating system includes: the second gear 33 is fixed above a bottom plate of the first turnover support 20; the left sliding plate 28 is mounted above the bottom plate of the first turnover support 20 via a second guide rail 27; the second cylinder 22 is also fixed above the bottom plate of the second turnover support 20, and the output end of the second cylinder 22 is connected with the lower part of the left sliding plate 28; a second rack 29 is fixed below the left sliding plate 28, and the two fourth bearing seats 31 are fixed above the left sliding plate 28; the two left shafts 30 are mounted inside the fourth bearing seats 31 via bearings; two V-shaped rollers 32 are respectively mounted above the two left shafts 30; the right sliding plate 56 is mounted above the bottom plate of the first turnover support 20 via a second guide rail 27; a second rack 29 is fixed below the right sliding plate 56, and the two sixth bearing seats 55 are fixed above the right sliding plate 56; the second rack 29 below the left sliding plate 28 and second rack 29 below the right sliding plate 56 are simultaneously engaged with the second gear 33; the two right shafts 54 are mounted inside the sixth bearing seats 55 via bearings; two V-shaped rollers 32 are respectively mounted above the two right shafts 54; the sixth servo motor 57 is fixed below the right sliding plate 56, and the output end of the sixth servo motor 57 is connected with the lower end of one right shaft 54.

An upper brush system includes: the fifth shaft 36 is mounted below the rotating support 38 via bearing; the brush disc 34 is fixed at the leftmost end of the fifth shaft 36; the fourth belt pulley 35 is fixed at the left end of the fifth shaft 36, and arranged between the brush disc 34 and the rotating support 38; the brush shaft 53 is mounted at the right end of the fifth shaft 36; the third servo motor 40 is fixed on the left side of the rotating support 38, and the fifth belt pulley 39 is fixed at the output end of the third servo motor 40; the fourth belt pulley 35 is connected with the fifth belt pulley 39 via the third synchronous belt 37; the fifth bearing seat 42 is fixed below a bottom plate of the second turnover support 44; the sixth shaft 41 is mounted inside the fifth bearing seat 42 via bearings; the fourth servo motor 43 is fixed above the bottom plate of the second turnover support 44, and the output end of the fourth servo motor 43 is connected with the top of the sixth shaft 41; the top of the rotating support 38 is fixed below the sixth shaft 41; the second turnover support 44 is mounted below the upper sliding plate 47 via a pin roll; the fifth servo motor 45 is fixed on a side plate below the upper sliding plate 47, and the output end of the fifth servo motor 45 is connected with the pin roll for connecting the second turnover support 44; the upper sliding plate 47 is mounted below the upper lifting plate 48 via the third guide rail 49; the servo electric cylinder 46 is fixed below the upper lifting plate 48, and the output end of the servo electric cylinder 46 is connected with the upper sliding plate 47.

An upper lifting system includes: the two third cylinders 52 and the four upper guide sleeves 51 are fixed at the top of the frame 1; the four upper guide posts 50 matched with the four upper guide sleeves 51 are fixed at the top of the upper lifting plate 48; and the output ends of the two third cylinders 52 are articulated with the upper part of the upper lifting plate 48.

In the working process, the second cylinder 22 drives the four V-shaped rollers 32 via the second gear 33 and the second racks 29 to synchronously clamp a wheel, and the sixth servo motor 57 drives the clamped wheel to rotate; the third servo motor 40 drives the brush disc 34 via the third synchronous belt 37 to rotate; the third cylinders 52 drive the brush disc 34 via the upper guide posts 50 to descend, and when the brush disc 34 contacts a riser of the wheel, burrs thereon may be removed; the angle of the brush shaft 53 in the horizontal direction may be adjusted under the drive of the fourth servo motor 43 via the sixth shaft 41, the included angle between the brush shaft 53 and the vertical direction may be adjusted under the drive of the fifth servo motor 45 via the second turnover support 44, and the position of the brush shaft 53 in the horizontal direction may be adjusted under the drive of the servo electric cylinder 46 via the third guide rail 49; after the angle and position of the brush shaft 53 are adjusted to be proper, burrs may be removed from a cap seam allowance and a valve hole of the wheel with the use of the brush shaft 53; the five brush heads 18 are adjusted to pitch circles of bolt holes of the wheel under the drive of the seventh servo motor 60 via the first synchronous belt 7, the first gears 9, the first racks 10 and the like; the sixth servo motor 57 drives the wheel to rotate till the center of each bolt hole is just concentric with the axis of each brush head 18; the first cylinders 2 drive the brush heads 18 via the lower guide posts 61 to ascend, and when the brush heads 18 contact the bolt holes of the wheel, burrs may be simultaneously removed from the bolt holes; the second servo motor 19 drives the first turnover support 20 and the wheel via the second synchronous belt 23 to turn over 180 degrees, and burrs may also be removed from bolt hole counter bores by the same method.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multifunctional wheel burr removing device, comprising a frame, first cylinders, a lower fixed plate, first belt pulleys, first shafts, first bearing seats, a first synchronous belt, a lower lifting plate, first gears, first racks, first guide rails, sliding supports, first servo motors, second shafts, second bearing seats, springs, third shafts, brush heads, a second servo motor, a first turnover support, a second belt pulley, a second cylinder, a second synchronous belt, a third bearing seat, a third belt pulley, a fourth shaft, second guide rails, a left sliding plate, second racks, left shafts, fourth bearing seats, V-shaped rollers, a second gear, a brush disc, a fourth belt pulley, a fifth shaft, a third synchronous belt, a rotating support, a fifth belt pulley, a third servo motor, a sixth shaft, a fifth bearing seat, a fourth servo motor, a second turnover support, a fifth servo motor, a servo electric cylinder, an upper sliding plate, an upper lifting plate, a third guide rail, upper guide posts, upper guide sleeves, third cylinders, a brush shaft, right shafts, sixth bearing seats, a right sliding plate, a sixth servo motor, a seventh bearing seat, a seventh shaft, a seventh servo motor, lower guide posts and lower guide sleeves, a lower lifting system comprises: the two first cylinders and the four lower guide sleeves are all fixed on the lower fixed plate, and the four lower guide posts matched with the lower guide sleeves are fixed below the lower lifting plate; and the output ends of the first cylinders are articulated with the lower part of the lower lifting plate;

a burr brushing unit comprises: the first bearing seat is fixed below the lower lifting plate, and the first shaft is mounted inside the first bearing seat via bearings; the first gear is fixed at the upper end of the first shaft, and the first belt pulley is fixed at the lower end of the first shaft; the bottom of the sliding support is mounted above the lower lifting plate via the first guide rail; the first rack is fixed below the sliding support, and engaged with the first gear; the second bearing seat is fixed above a top plate of the sliding support; the second shaft is mounted inside the second bearing seat via bearings; the third shaft is in sliding fit with the upper end of the second shaft; the spring is mounted inside the second shaft, and arranged below the third shaft; the brush head is fixed at the top of the third shaft; the first servo motor is fixed below the top of the sliding support, and the output end of the first servo motor is connected with the lower part of the second shaft;

a lower brush system comprises five burr brushing units, which are uniformly distributed in the circumferential direction; the first synchronous belt is connected with the first belt pulleys in the five burr brushing units; the seventh servo motor is fixed below the lower lifting plate, and the output end of the seventh servo motor is connected with the lower part of the first shaft in one burr brushing unit;

a turnover system comprises: the second servo motor is fixed at the lower part of the left side of the frame, and the second belt pulley is fixed at the output end of the second servo motor; the third bearing seat is fixed on the left side of the frame, and arranged above the second servo motor; the fourth shaft is mounted inside the third bearing seat via bearings; the third belt pulley is fixed on the right side of the fourth shaft; the right end of the fourth shaft is fixed at the left end of the first turnover support; the second belt pulley is connected with the third belt pulley via the second synchronous belt; seventh bearing seat is fixed on the right side of the frame; the seventh shaft is mounted inside the seventh bearing seat via bearings, and the left end of the seventh shaft is fixed at the right end of the first turnover support;

a synchronous clamping and rotating system comprises: the second gear is fixed above a bottom plate of the first turnover support; the left sliding plate is mounted above the bottom plate of the first turnover support via a second guide rail; the second cylinder is also fixed above the bottom plate of the first turnover support, and the output end of the second cylinder is connected with the lower part of the left sliding plate; a second rack is fixed below the left sliding plate, and the two fourth bearing seats are fixed above the left sliding plate; the two left shafts are mounted inside the fourth bearing seats via bearings; two V-shaped rollers are respectively mounted above the two left shafts; the right sliding plate is mounted above the bottom plate of the first turnover support via a second guide rail; a second rack is fixed below the right sliding plate, and the two sixth bearing seats are fixed above the right sliding plate; the second rack below the left sliding plate and the second rack below the right sliding plate are simultaneously engaged with the second gear; the two right shafts are mounted inside the sixth bearing seats via bearings; two V-shaped rollers are respectively mounted above the two right shafts; the sixth servo motor is fixed below the right sliding plate, and the output end of the sixth servo motor is connected with the lower end of one right shaft;

an upper brush system comprises: the fifth shaft is mounted below the rotating support via bearings; the brush disc is fixed at the leftmost end of the fifth shaft; the fourth belt pulley is fixed at the left end of the fifth shaft, and arranged between the brush disc and the rotating support; the brush shaft is mounted at the right end of the fifth shaft; the third servo motor is fixed on the left side of the rotating support, and the fifth belt pulley is fixed at the output end of the third servo motor; the fourth belt pulley is connected with the fifth belt pulley via the third synchronous belt; the fifth bearing seat is fixed below a bottom plate of the second turnover support; the sixth shaft is mounted inside the fifth bearing seat via bearings; the fourth servo motor is fixed above the bottom plate of the second turnover support, and the output end of the fourth servo motor is connected with the top of the sixth shaft; the top of the rotating support is fixed below the sixth shaft; the second turnover support is mounted below the upper sliding plate via a pin roll; the fifth servo motor is fixed on a side plate below the upper sliding plate, and the output end of the fifth servo motor is connected with the pin roll for connecting the second turnover support; the upper sliding plate is mounted below the upper lifting plate via the third guide-rail; the servo electric cylinder is fixed below the upper lifting plate, and the output end of the servo electric cylinder is connected with the upper sliding plate;

an upper lifting system comprises: the two third cylinders and the four upper guide sleeves are fixed at the top of the frame; the four upper guide posts matched with the four upper guide sleeves are fixed at the top of the upper lifting plate; and the output ends of the two third cylinders are articulated with the upper part of the upper lifting plate;

in the working process, the second cylinder drives the four V-shaped rollers via the second gear and the second racks to synchronous clamp a wheel, and sixth servo motor drives the clamped wheel to rotate; the third servo motor drives the brush disc via the third synchronous belt to rotate; the third cylinders drive the brush disc via the upper guide posts to descend, and when the brush disc contacts a riser of the wheel, burrs thereon may be removed, the angle of the brush shaft in the horizontal direction may be adjusted under the drive of the fourth servo motor via the sixth shaft, the included angle between the brush shaft and the vertical direction may be adjusted under the drive of the fifth servo motor via the second turnover support, and the position of the brush shaft in the horizontal direction may be adjusted under the drive of the servo electric cylinder via the third guide rail; after the angle and position of the brush shaft are adjusted to be proper, burrs may be removed from a cap seal allowance and a valve hole of the wheel with the use of the brush shaft; the five brush heads are adjusted to pitch circles of both holes of the wheel under the drive of the seventh servo motor via the first synchronous belt, the first gears, the first racks and the like; sixth servo motor drives the wheel to rotate till the center of the each bolt hole is just concentric with the axis of each brush head; the first cylinders drive the brush heads via the lower guide posts to ascend, and when the brush heads contact the bolt holes of the wheel, burrs may be simultaneously removed from the bolt holes; the second servo motor drives the first turnover support and the wheel via the second synchronous belt to turn over 180 degrees, and burrs may also be removed from bolt hole counter bores by the same method.

\* \* \* \* \*